United States Patent

[11] 3,583,220

[72] Inventor Tatsuo Kawakami
 Tokyo, Japan
[21] Appl. No. 738,678
[22] Filed June 20, 1968
[45] Patented June 8, 1971
[73] Assignee Oval Kiki Kogyo Kabushiki Kaisha
 Tokyo, Japan

[54] FLOWMETER
 2 Claims, 3 Drawing Figs.
[52] U.S. Cl. ...................................... 73/205R,
 73/229
[51] Int. Cl. ...................................... G01p 5/00
[50] Field of Search ........................... 73/194,
 205, 212, 231, 229

[56] References Cited
 UNITED STATES PATENTS
 1,451,064 4/1923 Dunajeff .................. 73/212
 1,518,279 12/1924 Smoot .................... 73/205
 FOREIGN PATENTS
 758,094 9/1956 Great Britain .......... 73/231

Primary Examiner—Richard C. Queisser
Assistant Examiner—John K. Lunsford
Attorney—Michael S. Striker ABSTRACT: A fluid flow-measuring system, especially for fluids of high viscosity in which a pair of rotors is driven by the flow of the fluid passing from the inlet to the outlet of the meter, in which the rotary velocity of one rotor is transmitted to an integrating meter, and this one rotor is also connected to a servomotor, and in which any difference in pressure at the inlet and the outlet is detected by a pressure difference-detecting assembly, and the thus detected pressure difference is converted into an electric signal which is transmitted to the servomotor so as to rotate the latter and the rotor connected thereto in such a manner to reduce the pressure difference to substantially zero. The pressure difference-detecting assembly comprises a chamber partitioned by a diaphragm into two compartments, respectively connected by a pair of conduits to the region of the inlet and the outlet of the flow meter, the conduits and compartments being filled with a fluid of low viscosity and the ends of the conduits at the region of the inlet and the outlet being closed by flexible diaphragms.

INVENTOR:
TATSUO KAUAKAMI

BY: Michael S. Striker
ATTORNEY

FLOWMETER

This present invention relates to a flowmeter for measuring the quantity of materials of high viscosity or for measuring the quantity of various materials of high viscosity and high temperature.

The object of the present invention is to furnish a flowmeter in which the pressure difference upstream and downstream the flowmeter is measured by another fluid having a lower viscosity than the measured flow quantity for detecting said difference, which due to the viscosity of the measured fluid is very small (almost nil), whereby said difference can be established in very accurate manner.

It is another object of the present invention to prevent heat transmission from the hot fluid to be measured to certain portions of the flow meter to thus increase the useful life as well as the accuracy thereof.

It is a further object of the present invention to provide means for reducing the measured pressure difference to zero, to thereby also increase the accuracy of the flow meter.

Figure 1:
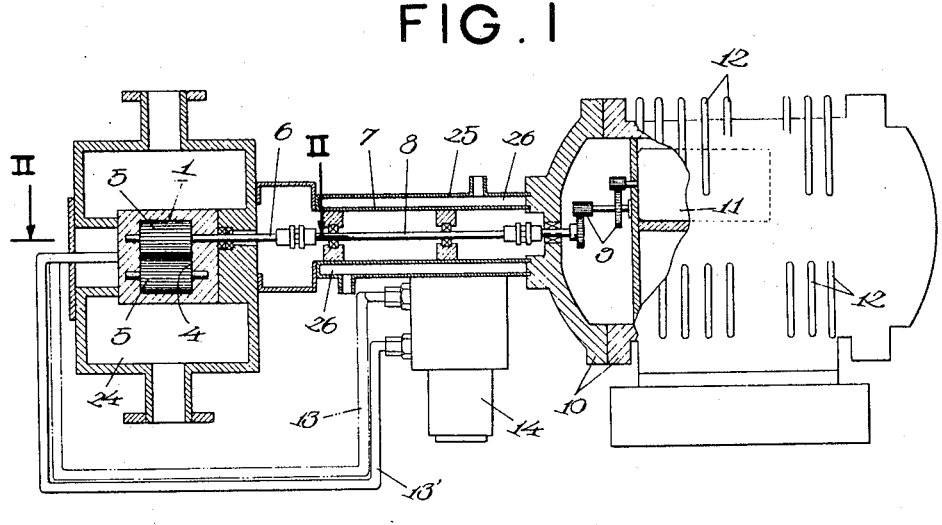
Figure 2:
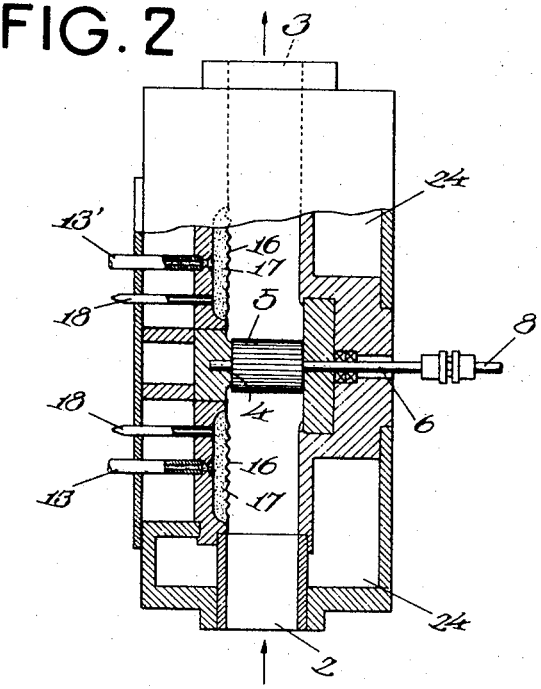
Figure 3:
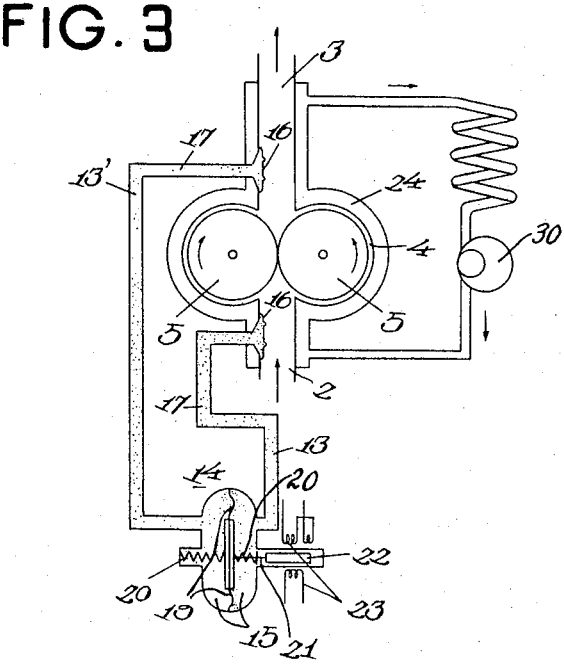

In consideration of the objects described above and other objects that may be described hereinbelow, an embodiment according to the present invention will be now described with reference to the accompanying drawings, in which, FIG. 1 is a partly sectioned front view of the flowmeter according to the present invention;

FIG. 2 is a partly cross sectioned view of part of the flowmeter shown in FIG. 1, this section being taken substantially along the line II–II of FIG. 1; and FIG. 3 is a schematic view illustrating the main features of the flowmeter according to the present invention.

FIG. 1 illustrates the flowmeter proper, partly cut open, with an inlet opening 2 and an outlet opening 3, and numeral 4 indicates the measuring chamber of said flowmeter proper 1 in which a pair of rotor 5,5 are mounted freely rotatable on a pair of bearings. Said rotors 5, 5 as shown in the accompanying drawings, are round gears mutually engaging of course, but they may be gears of elliptical shape and also the roots type or any other rotors. Since the measured fluid is of a fluid of high viscosity, the outlet opening is preferably large to prevent vibration of the rotors. Numeral 6 indicates one of the rotary shafts of said rotors 5, 5. Shaft 6 projects out of the measuring chamber 4 and is coupled by a magnetic or any other mechanical coupling, to a shaft 8 which passed longitudinally through a long cylindrical pipe 7, and is linked by means of a magnetic, or any other mechanical coupling, with a gear mechanism 9. Numeral 10 indicates a casing enclosing said gear mechanism 9, the servomotor 11, and a mechanism of the flowmeter for integrating the revolutions of the rotors 5. Numeral 12 indicates numerous projections projecting from the casing 10 as fins for dissipating heat, numerals 13, 13' indicate pressure difference-detecting conduits each of which has a first open end located either upstream or downstream of and after the rotors 5, 5 installed in the flowmeter chamber 4, whereas the other of each conduit communicates with the pressure difference-detecting chamber 15 of the pressure difference mechanism. Numerals 16, 16 (FIG. 2) indicate flexible plates, like diaphragms, which extend spaced from the first ends of the pressure differences detecting conduits 13, 13' within the flowmeter chamber 4 over these ends, and they also prevent the passing of the fluid to be measured into the pressure difference-detecting conduits. Numerals 17, 17' indicate a fluid different from the viscous fluid to be measured and by the diaphragms 16 sealed into the pressure difference-detecting conduits 13, 13' and the said flexible diaphragms 16, 16 separate the fluid in the conduits 13, 13' from the adjacent fluid body to be measured. Numeral 19 (FIG. 3) is a pressure difference-detecting device in form of a diaphragm which is interposed between the open ends of the pressure difference-detecting conduits 13, 13' within said pressure difference-detecting chamber 15 and installed therein under tension imparted thereto by a spring 20 a rod, extending through the spring 20, is connected at opposite ends to the diaphragm 19 and a differential transformer core 22 which, in turn, is surrounded by a differential transformer coil 23. The amount of electricity equivalent to the pressure difference is transmitted to the servomotor 11 through a servoamplifier of 69 watts. Numeral 24 indicates a heating jacket surrounding the flowmeter main body 1 through which a heated liquid of desired temperature is circulated by a pump 30. Numeral 25 indicates a cooling tube arranged coaxially about the cylindrical tube 7 for circulating a cooling liquid, i.e. water through a space 26.

Based on the condition described above, the operation of the present invention will now be described.

When the liquid of a high temperature and high viscosity to be measured is fed into the inlet opening of the flowmeter main body 1, the liquid to be measured passes between the rotors 5, 5 into the outlet opening, while rotating the rotors 5, 5. Since the flexible partition walls 16, 16 are provided at the inlet opening side 2 and the outlet opening side 4, deform the flexible partition plates 16, 16 will be deformed by the difference in the fluid pressure under measure upstream and downstream of the rotors 5 corresponding to the deformation by the pressure differences the fluids 17, 17' in the conduits 13, 13' are also moved, and the pressure difference detecting diaphragm 19 in the pressure difference-detecting chamber 15 of the pressure difference mechanism 14 deflected whereby the rod 21 connected to the diaphragm 19 is followingly moved and the differential transformer iron core 22 is also displaced, and basing on the change thereof the servomotor 11 is supplied with a driving energy via servoamplifier by the electric output of differential transformer.

Consequently, if the pressure on the side of output opening is lowered in comparison with the side of input opening and thereby some difference is generated in pressure, one rotating force is forcibly imparted to the rotors 5, 5 by the servomotor through the gear mechanism 9, so that the pressure difference thereby being is always maintained nearly zero.

In consequence, as there is almost no difference in pressure, there is no leakage through rotary portion of the flowmeter, whereby rotation of the rotors will be proportional to the quantity of liquid pressing from the inlet to the outlet.

On the other hand, as the flowmeter main body 1 has a heating jacket 24, variation in temperature of fluid is prevented at the time of measuring the flow quantity, and since the space portion 26 provided about the outer periphery of the cylindrical tube 7 is always flown through by cooling water, heat conduction from the flowmeter main body 1 to the servo portion and damages to the instrument is prevented at the same time the servomechanism and the mechanism for the flowmeter or the electrical mechanism thereof are located at a position spaced from the inner tube 7, and in addition since the heat dissipation from the housing 10 is made quite effective by the heat dissipation fins 12, errors due high temperatures as well as the damage of the mechanism can be prevented.

The described apparatus is especially suitable for the measurement of a fluid of high temperature and very high viscosity, since for the pressure difference detection a fluid different from the fluid to be measured is employed, since the measured fluid body is prevented from solidification, and since the pressure difference between the inlet opening and the outlet opening is maintained at zero, so that the flowmeter makes the accurate measurement of the fluid possible, and it can be highly appreciated that the fluid of high viscosity can be measured without error and more accurately, with a very small consumption of electricity, which had been considered to be impossible in the conventional flowmeters.

Also, according to the present invention, the measured fluid meter proper is always kept at constant high temperature by the heating jacket, and thereby an error in the instrument due to temperature variation is prevented, and in addition by having the servo driving portion portion and the power transmission portion cooled, the durability is increased and instrument damage thereof is prevented.

Furthermore, the invention has the advantages that rotors having a large capacity may be employed, such as large-sized elliptical rotors or roots-type rotors which are highly efficient for the measurement of fluid of high temperatures and high viscosity.

In the above, although an embodiment according to the present invention has been described, the present invention is not to be restricted to the details shown, since various modifications and structural changes may be made without departing in any way from the spirit of the present invention.

I claim:

1. A fluid flow-metering system, especially for metering fluid of high viscosity, comprising, in combination, wall means defining a chamber having an inlet and an outlet; a pair of meshing gear rotors located in said chamber to be rotated by said fluid to be measured and passing from said inlet to said outlet; a heating jacket surrounding said chamber for heating said fluid of high viscosity passing therethrough to reduce the viscosity thereof; pressure-sensing means for sensing the pressure difference between said chamber upstream and downstream of said pair of rotors; a casing spaced from said chamber and the heating jacket surrounding the same; electric servomotor means connected to one of said rotors for rotating the same, said servomotor means being located in said casing; a tube extending between said wall means forming said chamber and said casing; a shaft extending through said tube and connecting said one rotor with said servo motor means; means in said casing and connected to said shaft for indicating the amount of fluid passing through said metering system in dependence on the revolutions of said rotor; cooling means for cooling said tube to thus prevent transmission of heat imparted to said chamber by said servomotor and said indicating means; and means cooperating with said pressure-sensing means and said servomotor for producing an electrical signal depending on the magnitude of the difference of pressure sensed by said sensing means and for changing by said electrical signal the rotational speed of said servomotor means and that of said one rotor connected thereto in such a manner so as to reduce the pressure difference substantially to zero.

2. A fluid flow metering system as defined in claim 1, wherein said pressure-sensing means comprises a second chamber, a flexible diaphragm extending transversely through said second chamber and dividing the latter into a pair of discrete compartments, a pair of conduits each having a first and a second end, the first end of one of said conduits communicating with one of said compartments and the second end thereof ending in said first-mentioned chamber upstream of said rotors, and the first end of the other of said conduits communicating with the other of said compartments and the second end thereof ending in said first chamber downstream of said rotors, a fluid of low viscosity filling said conduits and said compartments, and a pair of flexible diaphragm means extending in said first chamber over said second ends of said conduits for separating said low viscosity fluid in said conduits from said high viscosity fluid to be measured, whereby any difference in the pressure of the fluid to be measured will be transmitted through said diaphragm means and the low viscosity fluid in said conduits to said flexible diaphragm in said second chamber to flex said diaphragm in the one or the opposite direction, and wherein said means for producing an electrical signal depending on the magnitude of the pressure difference comprises a differential transformer having a core connected to said diaphragm for moving therewith and a differential transformer coil surrounding said core and connected to said electrical servomotor means.